United States Patent
Shi

(10) Patent No.: US 11,068,569 B2
(45) Date of Patent: Jul. 20, 2021

(54) METHOD AND APPARATUS FOR HUMAN ACTIVITY TRACKING AND AUTHENTICITY VERIFICATION OF HUMAN-ORIGINATED DIGITAL ASSETS

(71) Applicant: BARRACUDA NETWORKS, INC., Campbell, CA (US)

(72) Inventor: Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 230 days.

(21) Appl. No.: 15/993,218

(22) Filed: May 30, 2018

(65) Prior Publication Data

US 2019/0197219 A1 Jun. 27, 2019

Related U.S. Application Data

(60) Provisional application No. 62/609,730, filed on Dec. 22, 2017.

(51) Int. Cl.
*G06F 21/31* (2013.01)
*G06F 21/32* (2013.01)

(52) U.S. Cl.
CPC .......... *G06F 21/316* (2013.01); *G06F 21/32* (2013.01); *G06F 2221/2133* (2013.01)

(58) Field of Classification Search
CPC ...... G06F 21/31; G06F 21/602; G06F 21/604; G06F 21/62; G06F 2221/2107; G06F 2221/2141; G06F 21/316; G06F 21/32; G06F 221/2133; H04L 63/102; H04L 9/32; H04L 9/0894; H04L 63/101; H04L 63/107; H04L 63/20; H04L 63/08; H04L 9/3226; H04L 2209/42; H04L 9/0866
See application file for complete search history.

(56) References Cited

U.S. PATENT DOCUMENTS

| | | | | |
|---|---|---|---|---|
| 7,792,791 | B2 * | 9/2010 | Smolen | G06F 16/2308 707/609 |
| 9,906,544 | B1 * | 2/2018 | Kurupati | H04L 63/1425 |
| 2004/0128243 | A1 * | 7/2004 | Kavanagh | G06Q 20/403 705/39 |
| 2011/0302420 | A1 * | 12/2011 | Davida | G06F 21/32 713/180 |
| 2012/0240224 | A1 * | 9/2012 | Payne | H04L 63/1416 726/21 |

\* cited by examiner

*Primary Examiner* — Daniel B Potratz
*Assistant Examiner* — Wansik You

(57) ABSTRACT

A new approach is proposed that contemplates systems and methods to support human activity tracking and authenticity verification of human-originated digital assets. First, activities performed by a producer while he/she is constructing a digital asset, e.g., an electronic message, are captured. Information/metadata of the captured activities are then packaged/encapsulated inside the constructed digital asset, wherein such metadata includes but is not limited to mouse and/or keyboard activities, software tools used, and other digital traces of the captured human activities. Once the digital asset is transmitted and received by a consumer, the metadata included in the digital asset is unpacked and analyzed to determine various levels of authenticity of the digital asset with respect to whether the digital asset is originated manually by a human being or automatically by a software program. The consumer may then take actions accordingly based on the level of authenticity of the received digital asset.

32 Claims, 2 Drawing Sheets

METHOD AND APPARATUS FOR HUMAN ACTIVITY TRACKING AND AUTHENTICITY VERIFICATION OF HUMAN-ORIGINATED DIGITAL ASSETS

CROSS-REFERENCE TO RELATED APPLICATIONS

This application claims the benefit of U.S. Provisional Patent Application No. 62/609,730, filed Dec. 22, 2017, and is entitled "Method and Apparatus for Authenticity Tracking and Verification of Human-originated Digital Assets," which is incorporated herein in its entirety by reference.

BACKGROUND

As more and more systems and devices are being connected together via networks every day, manual intermediate steps are still used to ensure that transactions among the systems and devices are legitimate and not fabricated or ran via large networks of botnets infected with malicious software and controlled as a group without the owners' knowledge, e.g., to send spam messages. It is also important to realize that artificial intelligence (AI) involved in building smarter systems can lead to potential scenarios where impersonation by a program or a set of programs may be capable of fooling human beings or launching cyber-attacks. This is especially true when it comes to communication mediums where human beings may take unwise actions that may lead to victimization due to theft of personal information and assets.

It is thus imperative to be able to clearly mark digital assets produced, transacted, and interacted by a human being via the systems and devices over the network so that the quality and substantiality of the information related to the digital assets can be understood when the assets are transferred, copied, or consumed by another human being. For a non-limiting example, an electronic message can be genuinely and manually constructed by a human being or automatically fabricated by a computer program running on a device, wherein content of the electronic message can be critical for human consumption and should not be hijacked or interrupted by the computer program. In such case, it is highly desirable to be able to ensure that the merits of human interaction are captured and translated to a level of trust between the two human actors, e.g., sender and recipient of the electronic message, which no device or computer program can replace.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
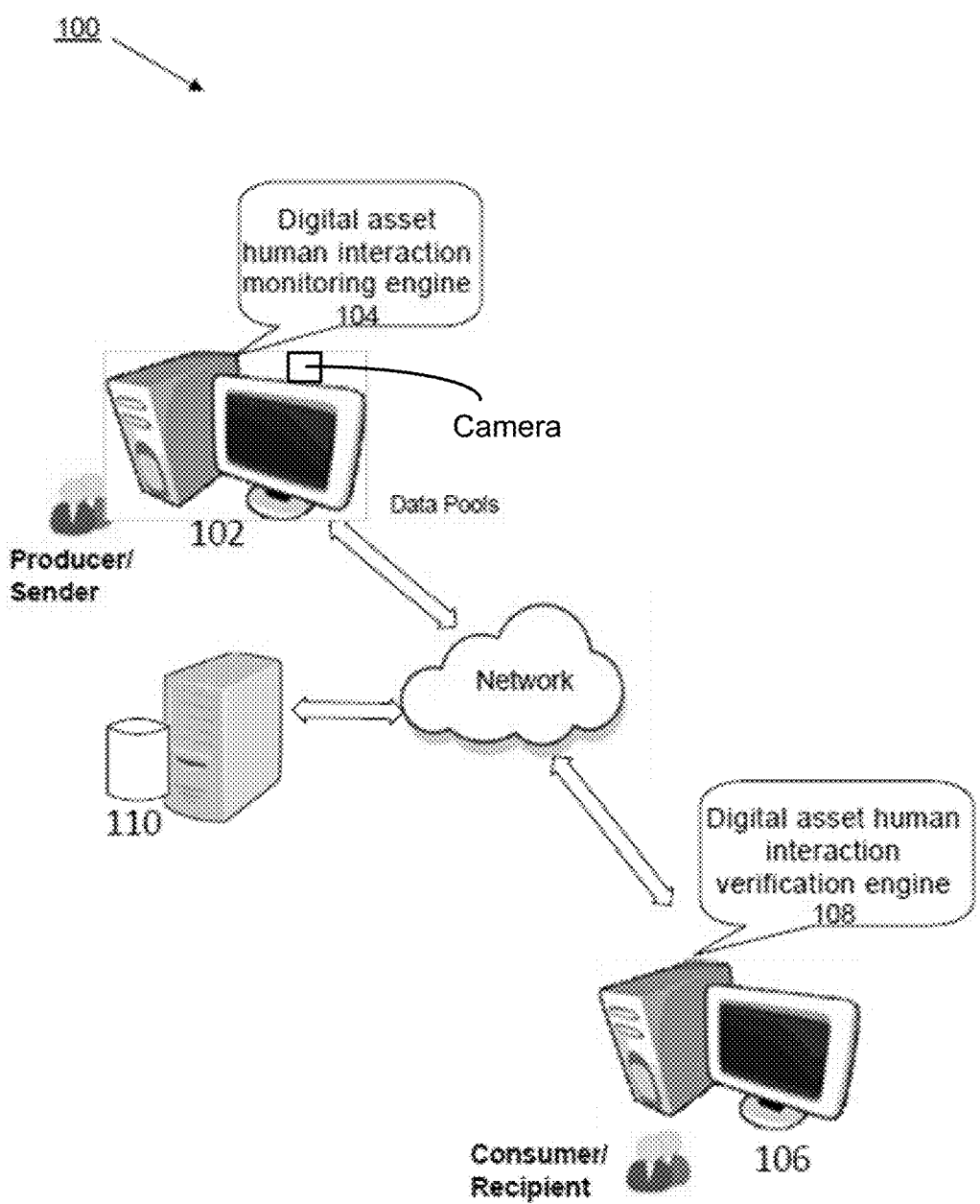
FIG. 1 depicts an example of a system diagram to support human activity tracking and authenticity verification of human-originated digital assets in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support human activity tracking and authenticity verification of human-originated digital assets. First, activities performed by a producer while he/she is constructing a digital asset, e.g., an electronic message, are captured. Information/metadata of the captured activities are then packaged/encapsulated inside the constructed digital asset, wherein such metadata includes but is not limited to mouse and/or keyboard activities, software tools used, and other digital traces of the captured human activities. Once the digital asset is transmitted over a network and received by a consumer, the metadata included in the digital asset is unpacked and analyzed to determine various levels of authenticity of the digital asset with respect to whether the digital asset is originated manually by a human being or automatically by a software program. The consumer may then take actions accordingly based on the level of authenticity of the received digital asset.

Randomness of human behaviors, activities, and interactions by a user with various computing units via input/output devices, e.g., mouse, keyboard, and touchscreen, along with human biometric of the user, can bring a high-level of unpredictability that fraud-prevention systems cannot emulate. By identifying, capturing, and providing such human activities and/or biometric data, the proposed approach provides accurate information on whom/when/where/what took place when the digital asset is being created to raise the level of awareness by the consumer of the digital assets. The proposed approach further enables verification by the producer/sender and/or the consumer/recipient of the digital asset to provide additional trust needed, especially for high-valued digital assets, to identify botnet activities and prevent systematic or AI-driven spoofed cyber-attacks. As used hereinafter, the term "producer," "sender," "consumer," or "recipient" refers a person or human being capable of manually originating a digital asset.

FIG. 1 depicts an example of a system diagram 100 to support human activity tracking and authenticity verification of human-originated digital assets. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a digital asset human interaction monitoring engine 104 running on an endpoint/host 102 associated with a producer/sender of a digital asset, a human-originated digital asset verification engine 108 running on an endpoint/host 106 associated with a consumer/recipient of the digital asset, and a human activity and biometric datastore 110 running on a host. Each of the computing units or hosts includes one or more processors with software instructions stored in a storage unit such as a non-volatile memory (also referred to as secondary memory) of the host for practicing one or more processes. When the software instructions are executed by the one or more processors of the host, at least a subset of the software instructions is loaded into a memory unit (also referred to as primary memory) by the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each host has a communication interface (not shown), which enables the engines to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

When a human being is interacting with a system or set of systems, e.g., the endpoint 102 associated with the producer/sender, to generate a digital asset, he or she must be conducting human interactions via one or more digital input and output devices associated with the endpoint 102. In the example of FIG. 1, the digital asset human interaction monitoring engine 104 is configured to monitor, track, and collect information/metadata related to human interactions or activities happening when a human actor, e.g., producer or sender, is originating/generating a digital asset via the endpoint 102 either locally or remotely over an active data-path monitoring the human interactions. Once collected, the information/metadata is recorded and maintained either locally or remotely in the biometric datastore 110. Here, the digital asset can be but is not limited to an electronic message and/or one or a combination of one or more of text, image, audio, video, or any other type of data in an electronic document format (for non-limiting examples, MS Word, PDF, Google Docs, etc.) that is attachable to the electronic message and deliverable over a network. Without limitation nor restriction, the metadata related to the human-originated digital asset includes and is not limited to types and frequencies of human interactions via the one or more digital input and output devices while creating the digital asset, e.g., mouse movements and keys pressed (e.g., number of "backspace" pressed) by the producer, and timing of such human interactions, e.g., time of day when the human interactions take place. For a non-limiting example, the digital asset human interaction monitoring engine 104 is configured to monitor a mouse movement by the producer by an active software component, e.g., an inclusive JavaScript, running on the endpoint 102 associated with the producer/sender. In some embodiments, the metadata related to the human-originated digital asset further includes biometric data of the producer, including but not limited to fingerprint and/or facial characteristics (e.g., information collected by FaceID) in digital format.

In some embodiments, the digital asset human interaction monitoring engine 104 is further configured to monitor and capture various circumstantial data of software programs running on the endpoint 102 and utilized by the producer to create the digital asset, wherein such software data can be used to determine if the digital asset is created by a human being manually through the human activities or by a software program automatically. For non-limiting examples, the digital asset human interaction monitoring engine 104 is configured to track active software programs, windows, timestamps, and/or coordinates of the windows opened and used by the producer while creating the digital asset. In some embodiments, if there is a camera (not shown) associated with the endpoint 102 associated with the producer/sender, the digital asset human interaction monitoring engine 104 is configured to capture images, videos, voice traces, facial characteristics, and/or other imagery of the producer to further guarantee that a human being is working to create the digital asset. In some embodiments, if there is a fingerprint collecting device (not shown) associated with the endpoint 102 associated with the producer/sender, the digital asset human interaction monitoring engine 104 is configured to collect fingerprint of the producer/sender in digital format.

Once the metadata related to the human-originated digital asset has been captured and recorded, the digital asset human interaction monitoring engine 104 is configured to package or attach the metadata to the human-originated digital asset. In some embodiments, the metadata is packaged and included with the digital asset in one single container attached to the electronic message. The digital asset human interaction monitoring engine 104 is then configured to transmit the human-originated digital asset together with the metadata to the human-originated digital asset verification engine 108 running on the endpoint 106 associated with a consumer/recipient of the digital asset over the network following certain commination protocols. In some embodiments, the digital asset human interaction monitoring engine 104 is configured to maintain a copy of the metadata related to the human-originated digital asset either locally or remotely in the human activity and biometric datastore 110 for further verification procedures.

In the example of FIG. 1, assuming there is zero loss or alteration to the metadata during transmission, the human-originated digital asset verification engine 108 is configured to unpack and analyze the metadata received with the human-originated digital asset to verify authenticity of the digital asset, e.g., the digital asset is created by a human being, not by a computer program automatically. In some embodiments, the human-originated digital asset verification engine 108 is configured to compare the copy of the metadata received with a copy of the metadata saved/maintained by the producer either locally or remotely on the human activity and biometric datastore 110 to verify the metadata has not been tampered with during transmission. In some embodiments, the human-originated digital asset verification engine 108 is configured to compare the unpacked metadata against known communication methods, protocols, and/or algorithms shared between the producer and consumer of the digital asset to confirm that the activities used to create the digital asset conform with communication patterns between the producer and consumer. If not, the human-originated digital asset verification engine 108 will designate the digital asset as machine/software generated vs. human-originated.

In some embodiments, the human-originated digital asset verification engine 108 is configured to verify the authenticity of the digital asset by interacting with the producer of the digital asset in real time via the digital asset human interaction monitoring engine 104. Such synchronous conversation with the producer mitigates any chance of AI emulated (vs. human-created) activities in the metadata of the digital asset for a cyber-attack. Specifically, the human-originated digital asset verification engine 108 is configured to pose one or more requests and/or questions to the producer of the digital asset that would require answers by a human being. For a non-limiting example, the human-originated digital asset verification engine 108 may identify from the metadata geo-location data of where the digital asset was created by the producer and to verify the geo-location data with the actual/known location of the producer when the digital asset was created. Depending on the responses and/or answers to its requests and/or questions received from the producer, e.g., whether the responses and/or answers match with its pre-stored records in a timely manner, the human-originated digital asset verification engine 108 is configured to determine with various level of certainty the authenticity of the digital asset, e.g., whether the digital asset is originated by a human being or not.

In some embodiments, if the metadata includes one or more of images, videos, voice traces, and/or biometric data captured by the digital asset human interaction monitoring engine 104 at the endpoint 102, the human-originated digital asset verification engine 108 is configured to compare and verify the captured images, videos, voice traces, and/or biometric data unpacked from the metadata with such types of data, either stored in the human activity and biometric datastore 110 or obtained through interactions with the producer in real time, to further verify that a human being, e.g., the producer, originated/created the digital asset.

Once the authenticity of the digital asset is determined, the human-originated digital asset verification engine 108 is configured to take appropriate actions to the digital asset accordingly. In some embodiments, the human-originated digital asset verification engine 108 may present the digital asset to the consumer/recipient of the digital asset only if it determines with 100% certainty that the digital asset is generated by a human being. Otherwise, if it determines that the digital asset is machine/software generated, the human-originated digital asset verification engine 108 may quarantine, reject, or delete the digital asset from the endpoint 106 to prevent the consumer from taking any actions on the digital asset, such as opening it, which may trigger a cyber-attack if the digital asset contains malware or viruses.

In some embodiments, once an action has been taken on the digital asset, e.g., either the digital asset has been presented to the consumer or rejected, the human-originated digital asset verification engine 108 is configured to track such action, generate a receipt for the action taken, and transmit the receipt to the producer of the digital asset to review. The producer may then confirm the action taken or alert the consumer to correct the action if, for non-limiting examples, a machine-generated digital asset is wrongly presented to the consumer or a human-originated digital asset is wrongly rejected.

Figure 2:
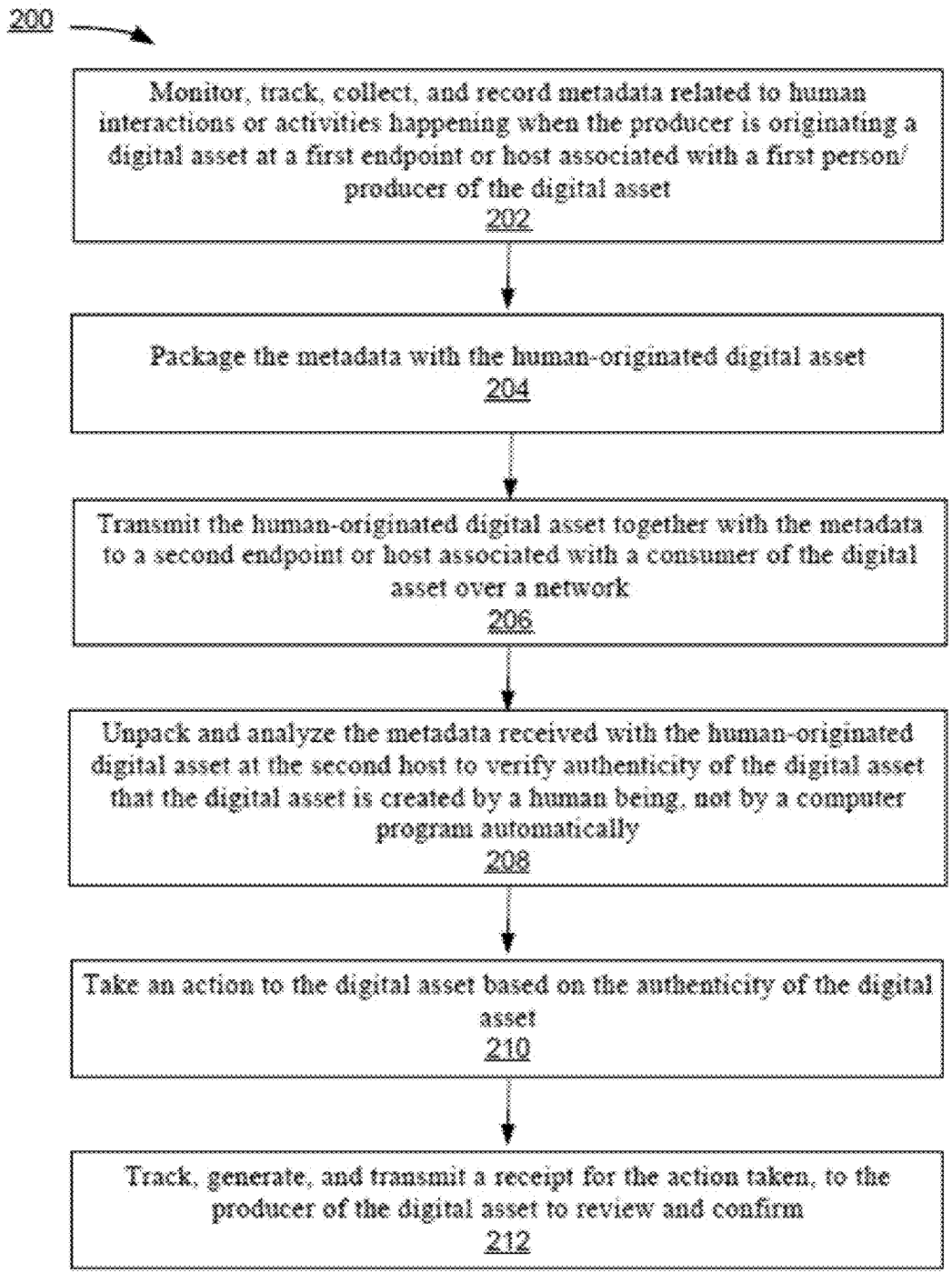
FIG. 2 depicts a flowchart of an example of a process to support human activity tracking and authenticity verification of human-originated digital assets in accordance with some embodiments.

FIG. 2 depicts a flowchart 200 of an example of a process to support human activity tracking and authenticity verification of human-originated digital assets. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where metadata related to human interactions or activities happening when the producer is originating a digital asset at a first endpoint or host associated with a first person/producer of the digital asset is monitored, tracked, collected, and recorded. The flowchart 200 continues to block 204, where the metadata is packaged with the human-originated digital asset. The flowchart 200 continues to block 206, where the human-originated digital asset is transmitted together with the metadata to a second endpoint or host associated with a consumer of the digital asset over a network. The flowchart 200 continues to block 208, where the metadata received with the human-originated digital asset at the second host is unpacked and analyzed to verify authenticity of the digital asset that the digital asset is created by a human being, not by a computer program automatically. The flowchart 200 continues to block 210, where an action is taken to the digital asset based on the authenticity of the digital asset. The flowchart 200 ends at block 212, where a receipt for the action taken is tracked, generated, and transmitted to the producer of the digital asset to review and confirm.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for a non-limiting example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support human activity tracking and authenticity verification of human-originated digital assets, comprising:
a digital asset human interaction monitoring engine running on a first endpoint/host device comprising a processor, wherein the first endpoint/host device is associated with a first person/producer of a digital asset and configured to
monitor, track, collect, and record metadata related to human interactions or activities happening when the first person/producer is originating creating the digital asset at the first endpoint/host device;
package the metadata with the first person/producer created digital asset;
transmit the first person/producer created digital asset together with the metadata to a second endpoint/host device comprising a processor, wherein the second endpoint/host device is associated with a second person/consumer of the digital asset that receives the first person/producer created digital asset transmitted over one or more communication networks;
a human-originated digital asset verification engine running on the second endpoint/host device and configured to
unpack and analyze the metadata received with the first person/producer created digital asset to verify authenticity of the digital asset that the digital asset is created by a human being, not by a computer program automatically;
take an action to grant the second person/consumer associated with the second endpoint/host device access to the digital asset based on a determination that the digital asset is created by a human being and take another action to limit the second person/consumer associated with the second endpoint/host device access to the digital asset based on a determination that the digital asset is created by a computer program;
track, generate, and transmit a receipt for the action or the another action taken, to the first person/producer of the digital asset; and
wherein the digital asset human interaction monitoring engine running on the first endpoint/host device associated with the first person/producer of the digital asset is further configured to confirm correctness of the action or the another action, and wherein the digital asset human interaction monitoring engine is further configured to transmit an alert to the second person/consumer to take corrective the action if the action or the another action taken is incorrect.

2. The system of claim 1, wherein:
the digital asset is an electronic message or one or a combination of one or more of text, image, audio, video, or data in an electronic document format that is attachable to the electronic message and deliverable over the network.

3. The system of claim 1, wherein:
the metadata related to the human activities includes types, frequencies, and timing of the human activities via one or more digital input and output devices of the first endpoint/host device while creating the digital asset.

4. The system of claim 3, wherein:
the digital asset human interaction monitoring engine is configured to monitor a mouse or key movement by the first person/producer via an active software component running on the first endpoint/host device.

5. The system of claim 3, wherein:
the metadata further includes biometric data of the first person/producer, including one or more of fingerprint and facial characteristics of the first person/producer in digital format.

6. The system of claim 1, wherein:
the digital asset human interaction monitoring engine is configured to
monitor and capture circumstantial data of the first person/producer to create the digital asset;
utilize the circumstantial data to determine if the digital asset is created by the first person/producer manually through the human activities or by a software program automatically.

7. The system of claim 6, wherein:
the digital asset human interaction monitoring engine is configured to track the software program, windows, timestamps, and/or coordinates of the windows opened and used by the first person/producer while creating the digital asset.

8. The system of claim 1, wherein:
the digital asset human interaction monitoring engine is configured to capture one or more of images, videos, voice traces, and biometric data of the first person/producer to verify that the first person is working to create the digital asset via a camera associated with the first endpoint/host device.

9. The system of claim 1, wherein:
the digital asset human interaction monitoring engine is configured to maintain a copy of the metadata related to the first person/producer created digital asset either locally on the first endpoint/host device or remotely on a storage server for further verification.

10. The system of claim 9, wherein:
the human-originated digital asset verification engine is configured to compare the metadata received with the copy of the metadata maintained by the first person/producer either locally on the first endpoint/host device or remotely on the storage server to verify the metadata has not been tampered with during transmission.

11. The system of claim 1, wherein:
the human-originated digital asset verification engine is configured to compare the unpacked metadata against one or more of known communication methods, protocols, and algorithms shared between the first person/producer and the second person/consumer of the digital asset to confirm that the activities used to create the digital asset conform with communication patterns between the first person/producer and the second person/consumer.

12. The system of claim 1, wherein:
the human-originated digital asset verification engine is configured to verify the authenticity of the digital asset by interacting with the first person/producer of the digital asset in real time.

13. The system of claim 12, wherein:
the human-originated digital asset verification engine is configured to identify from a metadata geo-location data of where the digital asset was created by the first person/producer and to verify the geo-location data with actual location of the first person/producer when the digital asset was created.

14. The system of claim 12, wherein:
the human-originated digital asset verification engine is configured to determine with various levels of certainty the authenticity of the digital asset depending on whether responses and/or answers to requests and/or questions received from the first person/producer match with pre-stored records in a timely manner.

15. The system of claim 8, wherein:
the human-originated digital asset verification engine is configured to verify the one or more of captured images, videos, voice traces, and biometric data unpacked from the metadata of the first person/producer by comparing it to either pre-stored or obtained through interactions with the first person/producer in real time to further verify that the digital asset is human-originated.

16. The system of claim 1, wherein:
the human-originated digital asset verification engine is configured to present the digital asset to the second person/consumer of the digital asset only if it determines that the digital asset is created by a human being.

17. The system of claim 1, wherein:
the human-originated digital asset verification engine is configured to quarantine, reject, or delete the digital asset from the second endpoint/host device if it determines that the digital asset is created by a computer program.

18. A computer-implemented method to support human activity tracking and authenticity verification of digital assets, comprising:
monitoring, tracking, collecting, and recording metadata related to human interactions or activities happening when a producer is creating a digital asset at a first endpoint or host to form a digital asset;
packaging the metadata with the digital asset;
transmitting the digital asset together with the metadata to a second endpoint or host associated with a second person/consumer of the digital asset over one or more communication networks;
unpacking and analyzing the metadata received with the digital asset at the second endpoint or host to verify authenticity of the digital asset that the digital asset is created by a human being, not by a computer program automatically;
taking an action to grant the second person/consumer associated with the second endpoint or host access to the digital asset based on a determination that the digital asset is created by a human being and take another action to limit the second person/consumer associated with the second endpoint or host access to the digital asset based on a determination that the digital asset is created by a computer program;
tracking, generating, and transmitting a receipt for the action or the another action taken, to the producer of the digital asset to review and confirm;
confirming the action taken if the action taken is correct and confirming the another action taken if the another action is correct, wherein the confirming is by the producer; and
transmitting an alert to the second person/consumer to correct the action if the action taken is incorrect and transmitting another alert to the second person/consumer to correct the another action if the another action taken is incorrect, wherein the transmitting the alert or the another alert is from the producer to the second endpoint or host.

19. The computer-implemented method of claim 18, further comprising:
monitoring a mouse or key movement by the producer via an active software component running on the first endpoint or host.

20. The computer-implemented method of claim 18, further comprising:
collecting biometric data of the producer in digital format.

21. The computer-implemented method of claim 18, further comprising:
monitoring and capturing circumstantial data of the producer to create the digital asset;
utilizing the circumstantial data to determine if the digital asset is created by the producer manually through the human activities or by a computer program.

22. The computer-implemented method of claim 21, further comprising:
tracking software programs, windows, timestamps and/or coordinates of the windows opened and used by the producer while creating the digital asset.

23. The computer-implemented method of claim 18, further comprising:
capturing one or more of images, videos, voice traces, and biometric data of the producer to verify that the producer is working to create the digital asset via a camera associated with the first host.

24. The computer-implemented method of claim 18, further comprising:
maintaining a copy of the metadata related to the digital asset either locally on the first host or remotely on a storage server for further verification.

25. The computer-implemented method of claim 24, further comprising:
comparing the metadata received with the copy of the metadata maintained by the producer either locally on the first host or remotely on the storage server to verify the metadata has not been tampered with during transmission.

26. The computer-implemented method of claim 18, further comprising:
comparing the unpacked metadata against one or more of known communication methods, protocols, and algorithms shared between the producer and the second person/consumer of the digital asset to confirm that the activities used to create the digital asset conform with communication patterns between the producer and the second person/consumer.

27. The computer-implemented method of claim 18, further comprising:
verifying the authenticity of the digital asset by interacting with the producer of the digital asset in real time.

28. The computer-implemented method of claim 27, further comprising:
identifying from a metadata geo-location data of where the digital asset was created by the producer and to verify geo-location data with actual location of the producer when the digital asset was created.

29. The computer-implemented method of claim 27, further comprising:
determining with various level of certainty the authenticity of the digital asset depending on whether responses and/or answers to requests and/or questions received from the producer match with pre-stored records in a timely manner.

30. The computer-implemented method of claim 23, wherein the one or more of captured images, videos, voice traces, and biometric data is part of the metadata and packaged with the digital asset, wherein the method further comprises:

comparing the one or more of captured images, videos, voice traces, and biometric data that is unpacked from the metadata, to either pre-stored or obtained through interactions with the producer in real time to further verify that the digital asset is human-created.

31. The computer-implemented method of claim 18, further comprising:

presenting the digital asset to the second person/consumer of the digital asset only if it determines that the digital asset is generated by a human being.

32. The computer-implemented method of claim 18, further comprising:

quarantining, rejecting, or deleting the digital asset from the second endpoint or host if it determines that the digital asset is machine/software generated.

* * * * *

UNITED STATES PATENT AND TRADEMARK OFFICE
CERTIFICATE OF CORRECTION

PATENT NO. : 11,068,569 B2
APPLICATION NO. : 15/993218
DATED : July 20, 2021
INVENTOR(S) : Fleming Shi Page 1 of 1

It is certified that error appears in the above-identified patent and that said Letters Patent is hereby corrected as shown below:

In the Claims

Column 7 Line 12 delete "originating"

Column 7 Line 51 delete "the" after the word corrective

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*